United States Patent
Bauer et al.

(10) Patent No.: US 10,214,803 B2
(45) Date of Patent: Feb. 26, 2019

(54) METHOD FOR MACHINING A CYLINDER WALL OF AN INTERNAL COMBUSTION ENGINE

(71) Applicants: BAYERISCHE MOTOREN WERKE AKTIENGESELLSCHAFT, München (DE); TECHNISCHE UNIVERSITÄT MÜNCHEN, München (DE)

(72) Inventors: Alois Bauer, Hohenthann (DE); Wolfram Wagener, Geisenhausen (DE); Patrick Woisetschlaeger, Straubing (DE)

(73) Assignees: BAYERISCHE MOTOREN WERKE AKTIENGESELLSCHAFT, München (DE); TECHNISCHE UNIVERSITÄT MÜNCHEN, München (DE)

( * ) Notice: Subject to any disclaimer, the term of this patent is extended or adjusted under 35 U.S.C. 154(b) by 0 days.

(21) Appl. No.: 14/914,466

(22) PCT Filed: Jul. 31, 2014

(86) PCT No.: PCT/EP2014/002114
§ 371 (c)(1),
(2) Date: Feb. 25, 2016

(87) PCT Pub. No.: WO2015/032461
PCT Pub. Date: Mar. 12, 2015

(65) Prior Publication Data
US 2016/0208370 A1 Jul. 21, 2016

(30) Foreign Application Priority Data

Sep. 5, 2013 (DE) .................... 10 2013 014 844

(51) Int. Cl.
*B05D 3/12* (2006.01)
*C23C 4/02* (2006.01)
(Continued)

(52) U.S. Cl.
CPC ................. *C23C 4/02* (2013.01); *C22F 1/04* (2013.01); *C23C 4/131* (2016.01); *F02F 1/004* (2013.01);
(Continued)

(58) Field of Classification Search
CPC .... C23C 4/02; C21D 7/04; C21D 7/06; C21D 7/08; C21D 2261/00
(Continued)

(56) References Cited

U.S. PATENT DOCUMENTS 5,380,564 A 1/1995 VanKuiken, Jr.
2008/0245227 A1* 10/2008 Iizumi .................. B23B 27/007
92/169.1
(Continued)

FOREIGN PATENT DOCUMENTS

DE 10014486 A1 10/2001
DE 102006004769 A1 8/2007
(Continued)

*Primary Examiner* — Kelly M Gambetta
(74) *Attorney, Agent, or Firm* — DeLio, Peterson & Curcio, LLC; Robert Curcio

(57) ABSTRACT

A method for machining a wall of a cylinder of an internal combustion engine, in which recesses in the wall are introduced by mechanical machining. The invention is characterized in that the wall is radiated with a medium under high pressure after the mechanical machining in order to introduce micro-recesses.

8 Claims, 2 Drawing Sheets

(51) Int. Cl.
*C22F 1/04* (2006.01)
*F16J 10/04* (2006.01)
*C23C 4/131* (2016.01)
*F02F 1/00* (2006.01)
*C21D 7/08* (2006.01)

(52) U.S. Cl.
CPC ................ *F16J 10/04* (2013.01); *C21D 7/08* (2013.01); *C21D 2261/00* (2013.01)

(58) Field of Classification Search
USPC ........................................................ 427/292
See application file for complete search history.

(56) References Cited

U.S. PATENT DOCUMENTS

2013/0183114 A1* 7/2013 Bermea .................. B23C 3/055
 409/131
2013/0284140 A1* 10/2013 Schramm ................ C23C 4/02
 123/193.2

FOREIGN PATENT DOCUMENTS

| | | |
|---|---|---|
| DE | 102008024313 A1 | 12/2009 |
| DE | 102009019674 A1 | 12/2010 |
| DE | 102009030683 A1 | 1/2011 |
| EP | 2246457 A1 | 11/2010 |
| EP | 2267178 A2 | 12/2010 |
| WO | 2012095215 A1 | 7/2012 |

\* cited by examiner

METHOD FOR MACHINING A CYLINDER WALL OF AN INTERNAL COMBUSTION ENGINE

BACKGROUND OF THE INVENTION

1. Field of the Invention

The invention relates to a method for machining a wall of a cylinder of an internal combustion engine, in particular the invention relates to a method for coating the cylinder wall in which this is roughened beforehand in order to improve the adhesion of the coating.

2. Description of Related Art

For reasons of weight, internal combustion engines in motor vehicles are regularly designed with an engine block made of light metal, in particular aluminum. However, it can prove problematic here that, due to the tribological properties of the light metal, in particular the comparatively poor resistance to wear, the inner walls of the cylinders formed by the engine block are only inadequately suitable as running surfaces for the pistons.

In order to avoid these problems, in many internal combustion engines with an engine block made of light metal cylinder liners made of, for example, grey cast iron are used, as a result of which the advantages of the light metal (low specific weight) can be combined with those of the grey cast iron (good tribological properties).

Alternatively, it is known for the cylinder walls of the light metal engine blocks to be provided with a coating in order to realize the desired tribological properties for the running surfaces. Such a coating is regularly realized by melting the coating material and spraying it onto the cylinder walls.

It is of particular importance in the coating of cylinder walls to achieve a good adhesion of the coating layer to the base material. For this purpose it is known for the cylinder walls of the engine block to be roughened prior to coating in order to increase the contact surface area between the layers. In many cases an attempt is also made to form undercuts in the roughened cylinder walls into which the melted coating material can penetrate in order to achieve a form-locking and force-locking connection with the cylinder walls following hardening.

Various different possible ways of roughening the cylinder walls are known.

These include, on the one hand, the methods known as "high pressure blasting", in which the cylinder walls are blasted with solid particles or a liquid under high pressure. As a result, particles of the wall material are broken out and the wall material is plastically deformed at individual points. In particular, blasting with corundum, which is delivered by means of a gas jet, as well as blasting with water or an emulsion are widely used. The gas jet or the liquid are thereby delivered from the nozzles which are used under a very high pressure of, regularly, 1500 bar to 3500 bar. One disadvantage of high pressure blasting is the rapid wear on the nozzles due to the high pressure, possibly in combination with the discharge of an abrasive material. In addition, adherence to tolerances of form and position is difficult and therefore associated with considerable expense and effort. And finally, this involves a high consumption of the medium used, which in some cases can also be associated with considerable effort expended on its preparation for recycling.

It is also known for the cylinder walls to be roughened mechanically. This can for example be achieved through rough turning, in which grooves or corrugations are formed in the cylinder walls in a cutting or non-cutting process using one or more tools.

It is for example known from DE 10 2009 027 200 B3, for the purpose of roughening a cylinder wall, in a first method step to introduce a helical groove with, in particular, rectangular or trapezoidal cross section into the cylinder wall. This can be achieved using both cutting and non-cutting processes. In a second step, the rib running helically between the grooves is then, in sections, plastically deformed in a radial direction in order to form undercuts. In order to introduce the groove a tool is used which has a single blade, the tool being both driven so as to rotate as well as being moved axially along the longitudinal axis of the cylinder.

It can prove disadvantageous in the known mechanical methods that the introduced profile can display a comparatively pronounced notch effect which occurs in particular with a cutting method of machining due to the resulting sharp-edged groove profile. Also, the tools are often unable to machine the ends of the cylinders completely. And finally, with the mechanical methods it is generally necessary subsequently to clean the machined cylinder walls in order to eliminate machining residues and to obtain oil- and dirt-free surfaces, which are necessary for a high-quality coating.

Alternative methods for preparing cylinder walls for a subsequent coating include chemical and electrical roughening, brushing and spraying with adhesive primer.

SUMMARY OF THE INVENTION

Starting out from this prior art, the invention was based on the problem of improving the quality of the anchoring of a coating layer to a cylinder wall.

This problem is solved through a method according to the claims. Advantageous embodiments of the method according to the invention are the subject matter of the claims and are explained in the following description of the invention.

The above and other objects, which will be apparent to those skilled in the art, are achieved in the present invention which is directed to a method for machining a wall of a cylinder of an internal combustion engine in which depressions are introduced into the wall by mechanical machining, wherein following the mechanical machining the wall is blasted with a medium under high pressure in order to introduce micro-depressions. The micro-depressions are introduced in the form of one or more circumferential grooves. The blasting may be carried out with a liquid. The blasting may further be carried out with a pressure less than or equal to 1500 bar, and more specifically with a pressure between 500 bar and 1500 bar.

A rib or ribs may be formed between the groove or grooves is/are deformed in order to form undercuts. The rib or ribs is/are deformed prior to blasting, and may be deformed by a deformation tool.

The wall is then finally coated.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figures 1, 2, 3, 4, 5:
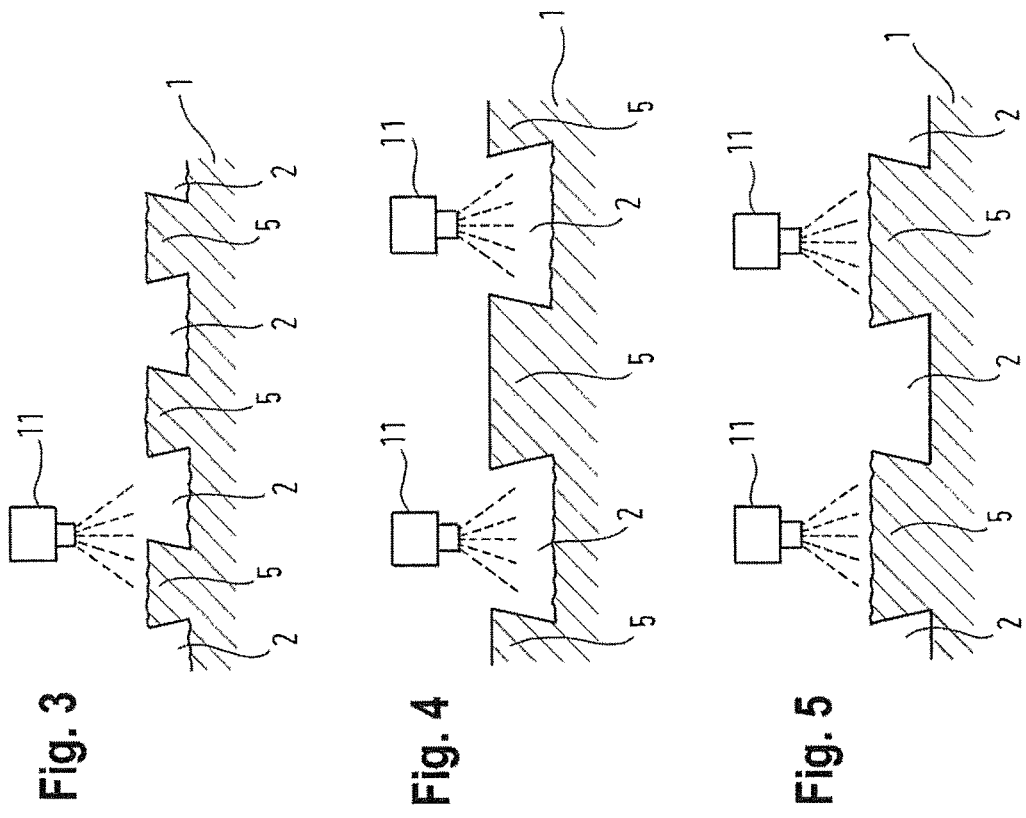
FIG. 1: shows the introduction of a helical groove in the cylinder wall as a first step of a method according to the invention for coating the cylinder wall.
FIG. 2: shows an alternative method for generating a profile with an undercut.
FIG. 3: shows a blasting of the cylinder wall as a second step of the method for coating the cylinder wall.
FIG. 4: shows an alternative procedure, in comparison with FIG. 3, for blasting the cylinder wall.
FIG. 5: shows a further alternative procedure, in comparison with FIG. 3, for blasting the cylinder wall.

In describing the preferred embodiment of the present invention, reference will be made herein to FIGS. 1-6 of the drawings in which like numerals refer to like features of the invention.

A generic method for machining (at least) one wall of (at least) one cylinder of an internal combustion engine in which depressions are introduced into the wall by means of mechanical machining is further developed according to the invention in that, after mechanical machining, the wall is blasted under high pressure with (at least) one medium in order to introduce micro-depressions into the wall.

"Mechanical machining" is understood to mean a process in which depressions are created in the wall of the cylinder by means of at least one tool mounted on a processing machine through direct contact using cutting or non-cutting methods (i.e. through plastic deformation).

"Micro-depressions" are understood to mean depressions which are smaller than the depressions introduced during the course of the mechanical machining, the dimensions of which in particular only correspond to a (small) fraction of the corresponding dimensions of the depressions.

Through the combination of mechanical machining and blasting under high pressure according to the invention it is possible to improve in particular the quality of the anchoring of a coating which is preferably subsequently applied to the machined wall. This is attributable to the combination of relatively large depressions, preferably provided with undercuts as a result of the mechanical machining, with the large number of relatively small micro-depressions which are created through the blasting. Overall, a significantly increased surface area of the machined wall as well as an increased density of the interlocking engagements between the machined wall and the coating layer can be realized in comparison with the known methods. A further advantage of the method according to the invention can be that the subsequent blasting of the previously mechanically machined wall renders cleaning, which is generally necessary with conventional mechanical roughening, superfluous.

In a preferred embodiment of the method according to the invention, the blasting, for which a liquid (e.g. water or an emulsion) is preferably used, takes place with a pressure of ≤1500 bar and particularly preferably with a pressure of between 500 bar and 1500 bar. In this way it can be ensured that micro-depressions can be introduced into the wall to an adequate extent and impurities, which can originate in particular from the preceding mechanical machining step, can be removed. At the same time it can be ensured that the structure created through the mechanical machining is substantially maintained and not eroded or flattened off through blasting under excessively high pressure. As a result of the pressure being significantly reduced in comparison with the known methods referred to as "high pressure blasting", adherence to tolerances of form and position does not generally represent a problem with blasting according to the invention.

The machining of the cylinder wall according to the invention can in particular serve to realize a good adhesion of a coating layer subsequently applied to the cylinder wall which serves as a running surface of the cylinder. Accordingly, the method according to the invention can include a coating of the cylinder wall in a final method step. This coating can be applied in any manner known within the prior art, whereby a thermal spraying method in which the coating material is sprayed in a molten state onto the cylinder wall and hardens there can preferably be used. Examples of thermal spraying methods include wire arc spraying and plasma coating.

"Finally" is understood to mean that the coating is carried out as the last of the method steps claimed as belonging to the invention in the different embodiments. This is not intended to rule out the possibility that further processing of the coated cylinder walls may be carried out following the coating process.

In a preferred embodiment of the method according to the invention, the depressions can be introduced in the form of one or more circumferential grooves. This allows a homogeneity or symmetry to be achieved in the structure of the machined wall, which can lead to a corresponding homogeneity in the anchoring of a subsequently applied coating and consequently to a high coating quality. Moreover, the introduction of circumferential grooves can be achieved relatively simply and thus economically during the course of mechanical machining. In such an embodiment of the method according to the invention, the subsequent blasting can also have the advantage that the edges and corners of the grooves are rounded off, as a result of which the notch effect which these can have is diminished.

In order to further improve the adhesion of the coating on the cylinder wall, it can also be the case that the rib or ribs formed between the groove or grooves are deformed prior to coating in such a way that these form undercuts (in relation to the radial direction, starting out from the longitudinal axis of the cylinder). As a result, an interlocking of the coating layer in the machined cylinder wall is achieved which can be equivalent to a form-locking connection. In addition, a compression of the material in the ribs can be achieved through the plastic deformation of the ribs, which can again improve the adhesion between the coating and the cylinder wall. Furthermore, the subsequent blasting of the wall can lead to the transitions from the flanks to the base of the grooves being "flushed out", as a result of which the undercuts formed by the ribs may also be enlarged.

Particularly preferably, the deformation of the ribs can take place prior to blasting. Otherwise this could lead to the micro-depressions formed through the blasting being smoothed off again during deformation.

FIGS. 1 to 6 show, in diagrammatic form, different steps, in some cases in alternative embodiments, of a method according to the invention for coating a (cylinder) wall 1 of a cylinder 8 formed by an engine block 7 as well as the equipment used for this purpose.

In a first step of the method according to the invention, a plurality of parallel circumferential grooves/groove sections 2 are introduced into the cylinder wall 1 by means of a cutting process.

FIG. 1 shows, as one possibility, the introduction of a helical groove 2 by means of a cutting tool 3 which possesses two blades 4 which are aligned obliquely in relation to one another. As a result of the oblique angle of the two blades 4, the sections of a rib 5 formed in each case between two sections of the groove 2 are trapezoidal in cross section. As a result these form on both sides an undercut in relation to the radial direction of the cylinder 8. By means of the undercuts in the rib sections 5, which represent a cylinder-side narrowing of the groove sections 2, a form-locking fixing of a subsequently applied coating layer 6 on the cylinder wall 1 can be achieved. The introduction of the groove 2 takes place continuously in that the cutting tool 3 begins the cut in the cylinder wall 1 at the ends of the cylinder 8, in relation to the longitudinal axis, and is moved in a combination of a rotary movement around the longitudinal axis 9 of the cylinder 8 and an advance in the direction of the longitudinal axis (see arrow in FIG. 1). This produces the helical course of the groove 2.

FIG. 2 shows an alternative possibility for introducing grooves/groove sections in the cylinder wall which narrow on the cylinder side. In this case, in a first step (not shown) one or more grooves 2 with initially substantially parallel groove walls are introduced in the cylinder wall 1 by means of a cutting process. This can in turn take place continuously, with a single groove 2 running in a helical course in this case. However, a discontinuous introduction of several parallel self-contained grooves 2 is also possible, in that a cutting tool (not shown) is successively positioned at defined positions on the longitudinal axis of the cylinder 8 and then driven rotatingly so as to perform a rotary movement around the longitudinal axis 9 of the cylinder 8 and moved in the radial direction until the desired groove depth is reached. The ribs/rib sections 5 formed between the grooves/groove sections 2 are then plastically deformed in order to form the undercuts or narrowings of the groove cross sections. A deformation tool 10 is used for deformation. The rotatingly driven deformation tool 10 is moved along the longitudinal axis 9 of the cylinder 8 and at the same time a deforming force is applied in a radial direction to the ribs/rib sections 5 (see arrow in FIG. 2).

Following the mechanical machining of the ribs/rib sections 5, the cylinder wall 1 is to be blasted. This is represented in a first embodiment in FIG. 3. For this purpose a medium, for example water, is applied to the cylinder wall 1 under high pressure by means of a nozzle 11, which can for example be designed as a conventional circular jet nozzle or flat jet nozzle. As a result, irregularly formed and arranged micro-depressions are introduced into the cylinder wall 1 containing the grooves/groove sections 2, which can lead to an improvement in the adhesion of the coating layer 6 subsequently applied to the machined cylinder wall 1. In addition, the blasting can lead to a rounding-off and flushing-out of the previously sharp edges and corners of the grooves/groove sections 2 and ribs/rib sections 5. This can reduce their notch effect (which can be particularly noticeable in the negative form of the coating layer 6).

The blasting of the previously mechanically machined cylinder wall 1 can take place over the entire surface area (see FIG. 3) or only over parts thereof. In FIG. 4, by way of example it is shown that only the base of the groove(s) is blasted, whereas FIG. 5 shows that only the ribs/rib sections 5 are blasted.

Figure 6:
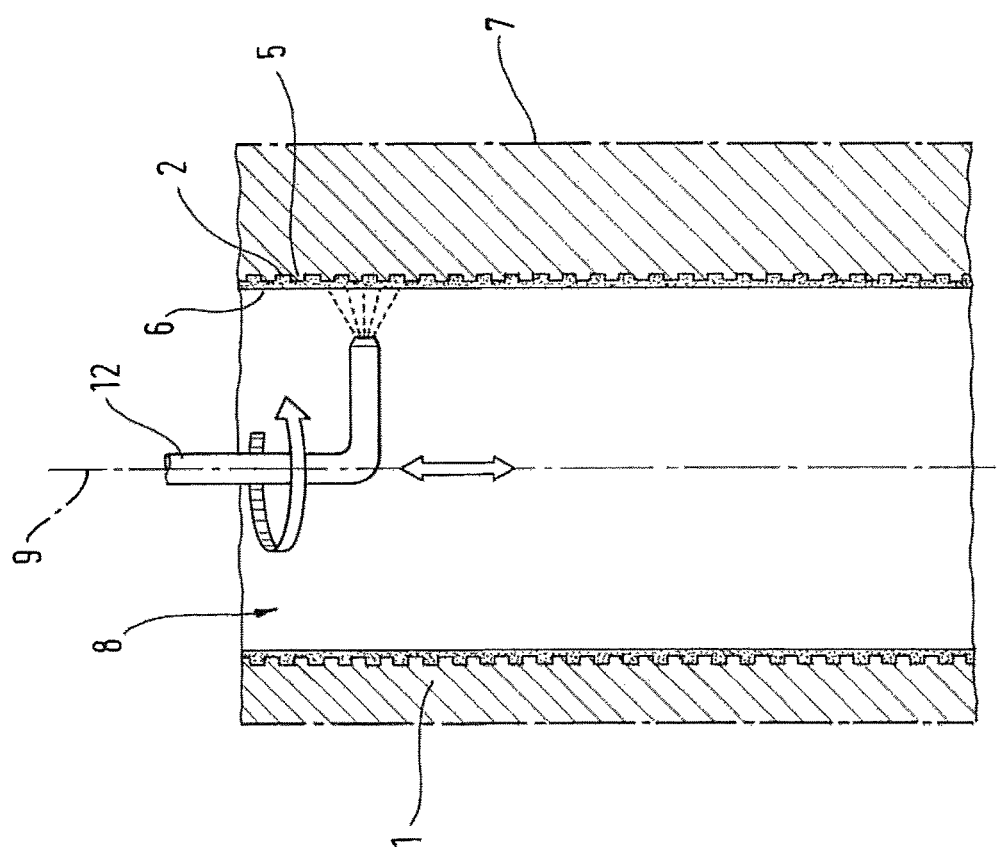
FIG. 6: shows an application of a coating layer to the previously machined cylinder wall as a third step of the method for coating the cylinder wall.

Finally, the coating layer 6 is applied to the machined cylinder wall 1 (see FIG. 6). This serves as a running surface for a piston (not shown) guided in the cylinder 8 of the internal combustion engine. The coating can in particular be applied by means of thermal spraying (for example wire arc spraying) for which purpose a spray head 12 is, in a known manner, rotatingly driven and moved along the longitudinal axis 9 of the cylinder 8. The melted coating material can thereby penetrate into the groove(s) (3), fill this/these and—after hardening—form the desired form-locking connection between the coating layer 6 and the cylinder wall 1.

If the engine block 7 has more than one cylinder 8, several and in particular all cylinders 8 can be machined according to the invention simultaneously.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method for machining a wall of a cylinder of an internal combustion engine comprising steps in the following order:
    a) introducing depressions in the form of a helical groove by means of a cutting tool which possesses two separate blades which are aligned obliquely in relation to one another and which cut in the wall simultaneously, wherein the two separate blades form on both sides of a rib an undercut in relation to a radial direction of the cylinder; and
    b) blasting the wall with a medium under high pressure in order to introduce irregularly formed and arranged micro-depressions.

2. The method of claim 1, wherein the blasting is carried out with a liquid.

3. The method of claim 1, wherein the blasting is carried out with a pressure less than or equal to 1500 bar.

4. The method of claim 3, wherein the blasting is carried out with a pressure between 500 bar and 1500 bar.

5. The method of claim 1 including finally coating the wall.

6. The method of claim 2, wherein the blasting is carried out with a pressure less than or equal to 1500 bar.

7. The method of claim 6, wherein the blasting is carried out with a pressure between 500 bar and 1500 bar.

8. A method for machining a wall of a cylinder of an internal combustion engine comprising steps in the following order:
    a) performing a single cutting step by introducing two separate blades into said cylinder, said two separate blades being aligned obliquely in relation to one another to form a helical groove depression, and that said two separate blades cut in the wall simultaneously, wherein the two separate blades form on both sides of a rib an undercut in relation to a radial direction of the cylinder; and
    b) blasting the wall with a medium under high pressure in order to introduce irregularly formed and arranged micro-depressions.

* * * * *